(12) United States Patent
Rousseau et al.

(10) Patent No.: US 9,167,202 B2
(45) Date of Patent: Oct. 20, 2015

(54) COMMUNICATION METHOD, COMMUNICATION TERMINAL, SUPERVISOR TERMINAL AND RELATED COMPUTER PROGRAMMES

(71) Applicant: THALES, Neuilly sur Seine (FR)

(72) Inventors: Stephane Rousseau, Saint-Cyr l'Ecole (FR); Guillaume Klech, Vanves (FR); Christophe Mathieu, Anthony (FR)

(73) Assignee: THALES, Neuilly sur Seine (FR)

( * ) Notice: Subject to any disclaimer, the term of this patent is extended or adjusted under 35 U.S.C. 154(b) by 68 days.

(21) Appl. No.: 14/134,859

(22) Filed: Dec. 19, 2013

(65) Prior Publication Data

US 2014/0176658 A1    Jun. 26, 2014

(30) Foreign Application Priority Data

Dec. 20, 2012 (FR) ...................... 12 03527

(51) Int. Cl.
| | |
|---|---|
| *H04N 7/14* | (2006.01) |
| *H04W 76/00* | (2009.01) |
| *H04W 4/10* | (2009.01) |
| *H04W 76/04* | (2009.01) |

(52) U.S. Cl.
CPC ............ *H04N 7/147* (2013.01); *H04W 76/005* (2013.01); *H04W 4/10* (2013.01); *H04W 76/041* (2013.01)

(58) Field of Classification Search
CPC . H04N 7/147; H04W 76/005; H04W 76/041; H04W 4/10; H04W 28/24; H04W 80/10; H04L 65/1089

USPC ............ 345/173; 348/14.01, 14.02; 381/150; 455/412.2, 414.1, 414.2, 418, 426.1, 455/445, 452.1, 466, 566, 567; 713/167; 715/808, 825; 370/338; 709/204, 223
See application file for complete search history.

(56) References Cited

U.S. PATENT DOCUMENTS

| | | | | |
|---|---|---|---|---|
| 6,879,828 | B2 * | 4/2005 | Virtanen et al. | ........... 455/426.1 |
| 7,499,719 | B2 * | 3/2009 | Rengaraju et al. | ........... 455/518 |
| 7,526,306 | B2 | 4/2009 | Brems et al. | |
| 8,204,547 | B2 * | 6/2012 | Jang | ............................ 455/566 |
| 8,213,914 | B2 * | 7/2012 | Kim et al. | ................... 455/414.2 |
| 8,559,659 | B2 * | 10/2013 | Chu et al. | ...................... 381/150 |
| 8,588,755 | B2 * | 11/2013 | Lee et al. | ........................ 455/418 |
| 8,666,437 | B2 * | 3/2014 | Stromberg et al. | ........... 455/466 |
| 8,719,342 | B2 * | 5/2014 | Mutikainen et al. | .......... 709/204 |

(Continued)

*Primary Examiner* — Gerald Gauthier
(74) *Attorney, Agent, or Firm* — Davidson Davidson and Kappel, LLC.

(57) ABSTRACT

A communication method in a communications network is provided. The method includes, in a communications network in which a communication link has been communication link having been allocated by a resource manager module in accordance with a first value of a characteristic of data rate, latency or jitter required for providing a first service on the said link between a first and a second communication terminal, the steps of transmitting a request to replace the said first communication service by a second communication service between at least the first and second terminals; further to receipt of the said request by the resource manager module of the network, replacing by the said resource manager module of the first value of the said characteristic by a second value required for providing the said second service; and providing the second communication service instead of the first communication service between the first and second terminals on the said communication link.

12 Claims, 3 Drawing Sheets

(56) References Cited

U.S. PATENT DOCUMENTS

| | | | |
|---|---|---|---|
| 8,737,968 B2* | 5/2014 | Hultkrantz et al. | 455/412.2 |
| 8,849,268 B2* | 9/2014 | Cho et al. | 455/418 |
| 8,879,528 B2* | 11/2014 | Rousseau et al. | 370/338 |
| 8,886,260 B2* | 11/2014 | Ryu et al. | 455/567 |
| 8,942,715 B2* | 1/2015 | Ahmadi | 455/452.1 |
| 2006/0079261 A1* | 4/2006 | Nakamura | 455/518 |
| 2006/0114314 A1 | 6/2006 | Dunko | |
| 2006/0172754 A1 | 8/2006 | Shin et al. | |
| 2006/0293073 A1 | 12/2006 | Rengaraju et al. | |
| 2007/0249357 A1* | 10/2007 | Aveline et al. | 455/445 |
| 2008/0178001 A1* | 7/2008 | Kim et al. | 713/167 |
| 2010/0045621 A1* | 2/2010 | Kang et al. | 345/173 |
| 2010/0097440 A1* | 4/2010 | Lee | 348/14.02 |
| 2010/0211666 A1* | 8/2010 | Kvernvik et al. | 709/223 |
| 2011/0202878 A1* | 8/2011 | Park et al. | 715/825 |
| 2012/0159387 A1* | 6/2012 | Oh et al. | 715/808 |
| 2013/0102292 A1* | 4/2013 | Kim | 455/414.1 |
| 2014/0176658 A1* | 6/2014 | Rousseau et al. | 348/14.01 |

* cited by examiner

COMMUNICATION METHOD, COMMUNICATION TERMINAL, SUPERVISOR TERMINAL AND RELATED COMPUTER PROGRAMMES

This claims the benefit of French Patent Application FR 12 03527, filed Dec. 20, 2013 and hereby incorporated by reference herein.

The present invention concerns a communication method in a communications network, a communication link having been allocated by a resource manager module in accordance with a set of characteristics required for providing a first service on said link and set up at least between a first communication terminal and a second communication terminal of the communications network. The set of required characteristics for the providing of the first service on the said link comprises a first value of at least one data rate and/or latency and/or jitter characteristic.

BACKGROUND

For example, in networks of Long Term Evolution type (LTE) a resource manager module called PCRF node (Policy and Charging Rules Function) allows the allocation of communication resources needed to provide a requested service.

A certain number of communication services require communication resources having different characteristics.

For example, alternate bidirectional communications of « voice » type also called Half-Duplex voice or Push-To-Talk (PTT), alternate bidirectional communications of « voice and video » type (comprising the real-time transmission of voice at the same time as video) also called Half-Duplex « video and voice » or Push-To-Video, simultaneous bidirectional communications of « voice » type also called Full-Duplex, voice, simultaneous bidirectional communications of « voice and video » type (comprising the real-time transmission of voice at the same time as video) also called Full-Duplex « voice and video », require resources having characteristics which differ in terms of communication data rate and/or latency and/or jitter.

Document U.S. Pat. No. 7,526,306 for example describes communications of PTT type.

Document US 2006/0114314 describes Half-Duplex « video and voice » communications.

Document US 2006/0172754 describes Full Duplex communications in a PMR network (Private Mobile Radiocommunication).

In networks of LTE type, further to a request for a first service e.g. a PTT service between two user terminals A and B, an exchange via a PCRF interface between an application server supervising the said first service and the PCRF node gives rise to the allocation by the PCRF node of a communication resource between the user terminals A and B having characteristics particularly in terms of data rate and/or latency which are required for this first service.

This interface, called Rx, is defined in version 9 of standard ETSI 3GPP relating to LTE technology.

When one of the user terminals A and B desires a second service e.g. of Push-To-Video type, it must close the first service thereby freeing the corresponding resource. It then submits a request for providing of the second service. An exchange, via the Rx interface, with the application server supervising the said second service gives rise to the allocation of a communication resource between the user terminals A and B with the characteristics particularly in terms of data rate and/or latency and/or jitter required for this second service.

SUMMARY OF THE INVENTION

It is an object of the present invention to provide a communication method of the aforementioned type, characterized in that it comprises the following steps during, the providing of the first service on the said communication link:

transmission of a request to replace the said first communication service by a second communication service between at least the first and second terminals;

further to receipt of the said request by the resource manager module of the network, replacement by the said resource manager module of the first value of said characteristic of the established communication link by a second value differing from the first value and required for the providing of the said second service;

and in that it further comprises a step to provide the second communication service instead of the first communication service between the first and second terminals on the said communication link.

The present invention provides a dynamic changeover of the type of communication service, without interrupting the communication in progress between the communication terminals. Therefore, whilst in the prior art it was not possible to add a video sending service during a voice call, this becomes possible with the invention.

In some embodiments the method of the invention further comprises one or more of the following characteristics:

the first and second communication services comprise different services from among alternate or simultaneous bidirectional communication services of voice call type or video call type;

the method, during the providing of the first, service on said communication link, comprises a detection step by a terminal among the first terminal and the second terminal to detect the selection made by a user of the terminal of the second service from among the group of second service(s) differing from the first service, the said request transmission step being performed by the said terminal in relation to the said detection step;

the method comprises a display step during the providing of the first service on the said communication link, on a display screen of at least one terminal from among the first terminal and the second terminal, displaying a sub-menu of the operating menu of the first service in the progress of being provided, the said sub-menu listing a group of second service(s) differing from the first service currently being provided and comprising at least the second communication service; and it comprises a detection step by the said terminal to detect the selection made by a user of the terminal of the second service included in the group of second service(s) differing from the first service, the said request transmission step being performed by the said terminal in relation to the said detection step;

the method comprises a display step during the providing of the first service on the said communication link, on a display screen of at least one supervisor terminal remote from the first terminal and from the second terminal, displaying a sub-menu of the operating menu relating to the first service currently being provided, the said sub-menu listing a group of second service(s) differing from the service and comprising at least the second communication service; and it comprises a detection step by said supervisor terminal of the selection made by a user of the said supervisor terminal of the second service from among the group of second service(s) differing from the first service, the said request transmission step being performed by the said supervisor terminal in relation to the said detection step;

the method comprises a comparison step with a fixed threshold of the time length of non-use of a functionality contained in the first service and not included in the second service, and in which the transmission of the request is a function oldie comparison step;

the communication network comprises an LTE network and the resource manager module is a PCRF node.

According to a second aspect, the present invention proposes a user terminal adapted so that, further to the establishing of a communication link between at least the said terminal and another communication terminal in a communications network and allocated by a resource managing module in accordance with a set of characteristics required for implementing a first service and comprising a first value of at least one characteristic of data rate and/or latency and/or jitter, it can implement the first service on the said communication link;

the said terminal being characterized in that it is further adapted so that, during the implementing of the first service on the said communication link, it can receive notification from the network on the replacement of the first communication service by a second communication service between at least the terminal and the said other terminal;

and in that it is adapted so that, further to the said notification, it can implement the said second communication service with the other terminal on the said modified communication link, in lieu and stead of the said first communication service.

According to a third aspect, the present invention proposes a supervisor terminal adapted so that, further to the establishing of a communication link between at least one communication terminal and another communication terminal within a communications network and allocated, by a resource manager module in accordance with a set of characteristics required for implementing a first service comprising a first value of at least one characteristic of data rate and/or latency and/or jitter, and further to the implementing of the said first service on the said communication link, it can display a supervision menu of the said first service implemented between the said terminal and other terminal;

the said supervisor terminal being characterized in that it is also adapted so that, during the implementing of the first service on the said communication link, it can transmit a request to replace the said first communication service by a second communication service between at least the communication terminal and the said other communication terminal;

and in that it is adapted so that, further to the replacement by the said resource manager module of the first value of the said characteristic of the established communication link by a second value dining from ten first value and required for implementing the said second service, it can display a supervision menu of said second service implemented between ten said communication terminal and other communication terminal.

According to a fourth aspect, the present invention proposes a computer programme intended for a communication terminal in a communications network, comprising software instructions which, when executed on computing means, carry out the following steps further to the establishing of a communication link between at least the said terminal and another communication terminal in a communications network and allocated by a resource manager module in accordance with a set of characteristics required for implementing a first service comprising a first value of at least one characteristic of data rate and/or latency and/or jitter, in order to implement the said first service on the said communication link:

during the implementing of the first service on the said communication link, receiving notification from the network on the replacement of the said first communication service by a second communication service between at least the terminal and said other terminal;

further to said notification, implementing the said second communication service with the other terminal on the said modified communication link, in lieu and stead of the said first communication service;

According to a fifth aspect, the present invention proposes a computer programme intended for a supervisor terminal of a communications network, comprising software instructions which, when executed on computing means, carry out the following steps subsequent to the establishing of a communication link between at least one communication terminal and another communication terminal in a communications network, allocated by a resource manager module in accordance with a set of characteristics required for implementing a first service and comprising a first value of at least one characteristic of data rate and/or latency and/or jitter, in order to implement the said first service on the said communication link:

displaying a supervision menu of the said first service implemented between the said terminal and other terminal;

during the implementation of the first service on said communication link, transmitting a request to replace the said first communication service by a second communication service between at least the communication terminal and said other communication terminal;

further to replacement by the said resource manager module of the first value of said characteristic of the established communication link by a second value different from the first value and required to implement the said second service, displaying a supervision menu of said second service implemented between the said communication terminal and other communication terminal.

BRIEF DESCRIPTION OF THE DRAWINGS

These characteristics and advantages of the invention will become apparent on reading the following description given solely as an example and with reference to the appended drawings in which.

DETAILED DESCRIPTION

Figure 1:
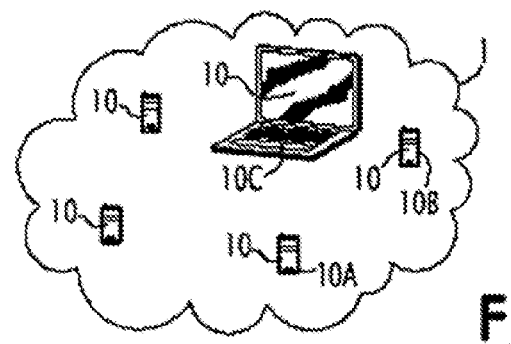
FIG. 1 illustrates a communication network in one embodiment of the invention.

In FIG. 1, a communication network 1 in one embodiment of the invention is illustrated allowing the implementing of telecommunications between user terminals 10, accessing the network by radio for example.

In the case under consideration, the application of the invention is described with reference to a network 1 of LTE type.

Figure 2:
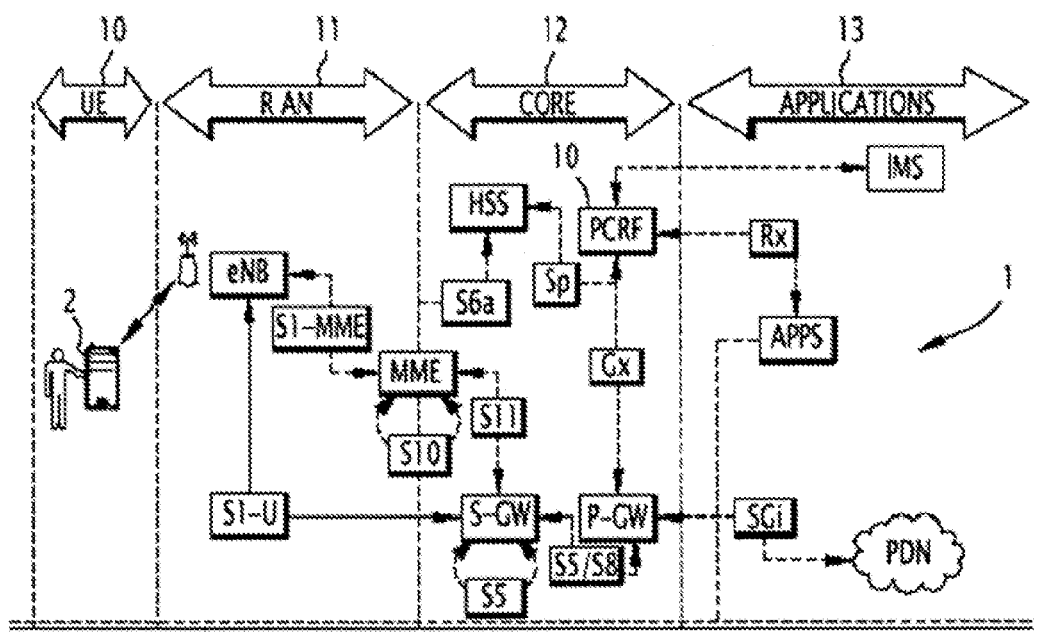
FIG. 2 schematises the architecture of the network in FIG. 1 in one embodiment of the invention.

With reference to FIG. 2, the architecture of a said network 1 comprises the following functional elements: the user terminals 10 called User Equipment (UE), the Radio Access Network 11 (RAN), the central part of the network 12 (CORE) and APPLICATIONS part 13.

This architecture is known to persons skilled in the art and defined by LTE standards.

Each user mobile terminal 10 is adapted to access the RAN by radio. Within the RAN 11, an eNodeB module (eNB) is adapted to act as interface via radio with this user terminal 10 when a said eNB module is in radio proximity with the terminal 10.

The MME module, on the boundary between the RAN 11 and CORE 12 is adapted to manage the attaching of the user terminal 10 to the network 1 and is adapted to communicate in particular with the HSS module of the CORE 12 to verify that a user terminal 10 is indeed referenced within the network 1, and with the S-GW for bearer activation of a communication link involving this user terminal in relation to this verification.

In the CORE 12, the S-GW and P-GW modules are adapted to contribute towards setting up a communication link between user terminals, and the PCRF module is adapted to allocate and manage the characteristics of the allocated links, notably in terms of minimum guaranteed data rate on the link and/or maximum guaranteed latency on the link.

In the « APPLICATIONS» part 13, an APPS server is adapted to manage access of the user terminals to at least one communication service.

The blocks positioned between two modules in FIG. 2 and linked to each of these modules by a dotted arrow designate the interfaces between the modules. For example, the Rx interface allows the interfacing of the PCRF and APPS modules.

In one embodiment of the invention, the following steps are performed.

These steps follow after the execution of corresponding software instructions in the concerned terminals or modules within the network 1.

Let us consider that a user A of the user terminal 10A wishes to establish a PTT service with a user B of user terminal 10B, these two user terminals belonging to the terminals 10 of the network 1 and each comprising a screen and keypad.

Figure 3:
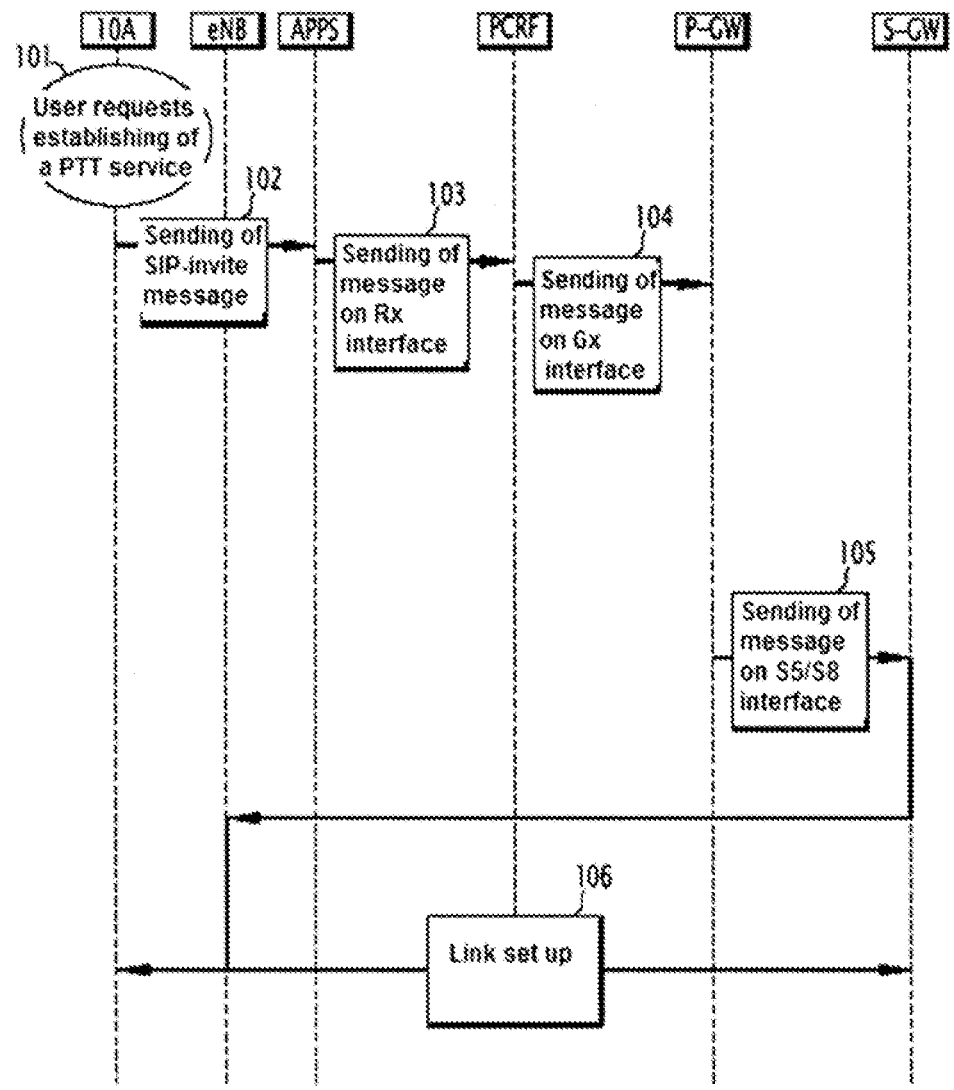
FIG. 3 is a flow chart of steps implemented in one embodiment of the invention.

With reference to FIG. 3, at step 101, user A instructs terminal 10A to set up a PTT service with user B.

For example, this instruction is performed by user A by first pressing on a button of terminal 10A indicating selection of the PTT service (this may be a physical button or it may be represented on a touch screen of the terminal) or by using a keypad of terminal 10A for this selection, an option in a menu showing all the offered communication services including a PTT service and a video PTT service for example. Subsequent to this selection of service, terminal 10A displays on its screen a list of possible contacts of user A to take part in this PTT service. The user of terminal A chooses user B of terminal 10B.

At step 102, the user terminal 10A detects this user instruction. It then transmits a message via the network 1 and in particular via the eNB with which it is interfaced, to the APPS server in charge of the PTT service, this message for example being, a message of « SIP Invite» type indicating this chosen PTT service, the identification of the sender terminal 10A and the identification of the receiver terminal 10B.

At step 103 the APPS server, in relation to the content of databases corresponding to user A, verifies that user A is indeed authorised to request the providing of the PTT service, and also verifies that receiver B is able to take part in said service.

It further verifies whether the receiver B and/or the user terminal 10B is available. It then verifies whether receiver B and/or user terminal 10B wishes to receive the PTT service requested by user A, by sending a « SIP Invite» message to terminal 10B indicating the PTT service and the identification of the requesting terminal 10A.

The APPS server determines any possible particularities associated with the providing of the PTT service to this user A and/or to terminal 10A, to user B and/or to user terminal 10B. Thereafter, if the providing of the requested service is indeed authorised and a positive message is received from user terminal 10B in response to the « SIP Invite» message sent to it, the APPS server sends a message to the PCRF module via the interface Rx requesting the providing of a PTT service, identifying the requesting terminal 10A, identifying the receiver terminal 10B and any particularities associated with the providing of the PTT service.

If the providing of the requested service is not authorised or if a negative message is received from user terminal 10B in response to the « SIP Invite» message sent to it, a message is sent by the APPS server to terminal 10A indicating that the requested PTT service cannot be provided and instructing the display or a corresponding indication on the screen of terminal 10A.

At step 104, the PCRF module receives the request message sent by the APPS server. It determines whether terminal 10A and/or terminal 10B is indeed authorised to implement this service. If the providing of the requested service is indeed authorised, it authorises the establishing of the communication link needed between the terminals 10A and 10B for the providing of the requested PTT service. It determines a service quality level from among a group of several levels e.g. 5 levels: Q1, Q2, Q3, Q4 and Q5 corresponding to the requested service. The indicated level of service quality is dependent on the requested service. It represents the value defined as a function of the requested service, of maximum latency and/or of minimum data rate and/or of maximum jitter on the link. For example, Q1 corresponds to the PTT service.

The minimum data rate of a link is the minimum amount of data the number of bits, number of data packets) transmitted per second on the link.

The maximum latency of a link is the maximum time lapse between the sending of a data item from one end of the link and the receiving of this data item at the other end of the link.

The maximum jitter of a link is the maximum reception time between two consecutively transmitted packets.

For example, in the case wider consideration, a minimum data rate of 8 kbps (kilobits per second) or maximum latency of 150 ms (milliseconds) or minimum jitter of 100 ms are fixed.

The PCRF module then transmits a message to the P-GW module through the interface Gx, requesting the effective application of the characteristics corresponding to Q1 on a link to be allocated between the terminals 10A and 10B.

At step 105, the P-GW module relays this message via the S-GW module through the interface S5/S8 to the final destination eNB of terminal 10A After receipt of this message, at step 106, the eNB of terminal 10A, after verifying that the radio resources are sufficient, sets up a communication link corresponding to the requested level Q1 between terminal 10A and terminal 10B.

The communication is the set up at step 107 (not illustrated) between the user terminals 10A and 10B, and the PTT service can then be used by the users A and B of tense terminals using this communication link, each one able to talk to the other in non-simultaneous manner for example by pressing on a button of their user terminal.

During this communication, during their PTT exchanges, an operating menu of the PTT service is proposed by user terminal 10A to user A, for example by display of fields on the screen which can be selected by user A.

For example, these fields comprise an « END» field to terminate the communication and allow freeing of the link, an « ADDITIONAL RECEIVER» field to communicate with an additional receiver via this PTT service, and a « change to PUSH-TO-VIDEO» field.

Figure 4:
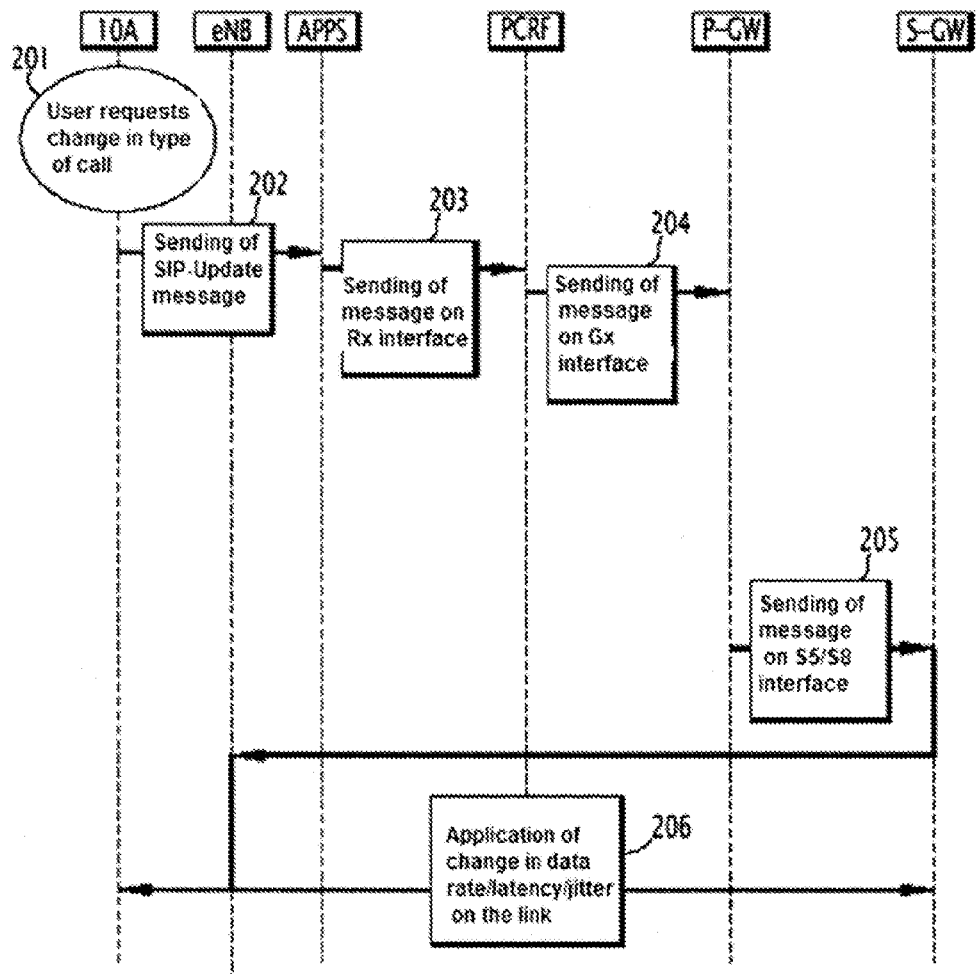
FIG. 4 is a flow chart of steps implemented in one embodiment of the invention.

In one embodiment, with reference to FIG. 4, the following steps are performed:

At step 201, the user A selects the field « change to PUSH-TO-VIDEO» for example by pressing with a finger on this field on the screen of the terminal 10A if it is a touch screen, or using the keys of the keypad. In this manner the terminal 10A is instructed to replace the PTT service with user B by a PUSH-TO-VIDEO service with user B, without interrupting the communication.

At step 202, the user terminal 10A detects this user instruction. It therefore transmits a message via the network 1 and in particular via the eNB with which it is interfaced to the server in charge of the PUSH-TO-VIDEO service, which here is also the APPS server, the message being a message of « SIP Update» type for example indicating this instruction to replace the PTT service with user B by a PUSH-TO-VIDEO service together and indicating the identification of the sender terminal 10A.

At step 203 the APPS server, in relation to the content of databases corresponding to user A, verifies that user A is indeed authorised to request the providing of the PUSH-TO-VIDEO, service and also verifies whether receiver B can take part in a said service.

It further verifies whether the receiver B wishes to receive the PUSH-TO-VIDEO service instead of the PTT service without interruption of communication such as requested by user A, by sending a « SIP Update» message to terminal 10B indicating the PUSH-TO-VIDEO service in replacement of the PTT service without interruption of the communication, and also indicating the identification of the requesting terminal 10A.

The APPS server determines any particularities associated with the providing of the PUSH-TO-VIDEO service to this user A and/or to terminal 10A, to user B and/or to user terminal 10B If the providing of the PUSH-TO-VIDEO service is indeed authorised and a positive message is received from user terminal 10B in response to the « SIP Update» message sent to it (user B having accept replacement of the PTT service by the PUSH-TO-VIDEO service without interrupting the communication), the APPS server sends a message to the PCRF module via the interface Rx. This message requests the providing of a PUSH-TO-VIDEO service to replace the PTT service without interruption of the communication, also indicates the identification of the requesting terminal 10A, the identification of receiver terminal 10B and any particularities associated with the providing of the PUSH-TO-VIDEO service.

If the providing of the PUSH-TO-VIDEO service is not authorised or if a negative message is received from user terminal 10B in response to the « SIP Update» message sent to it, a message is sent by the APPS server to terminal 10A indicating that the requested PUSH-TO-VIDEO service cannot be provided.

At step 204, the PCRF module receives the request message sent by the APPS server. It determines whether terminal 10A and/or terminal 10B effectively has authorisation to implement this PUSH-TO-VIDEO service. If the providing of the requested service is indeed authorised, and in relation to this message and in particular in relation to the PUSH-TO-VIDEO service indicated therein, it determines the modification(s) to service quality to be made on the communication link between the terminals 10A and 10B to provide the PUSH-TO-VIDEO service as a replacement for the PIT service, in particular in terms of maximum latency and/or minimum data rate and/or maximum jitter on the link. The service quality level changes over here from Q1 to Q2.

It then transmits a message to the P-GW module via the interface Ox requesting the effective implementation of the changes to the characteristics (changeover from Q1 to Q2) of this link allocated between the terminals 10A and 10B.

For example, in the case under consideration, the changes concern the value of minimum data rate which becomes 300 kbps.

At step 205, the P-GW module relays this message via the S-GW module through the interface S5/S8 to the final destination eNB of terminal 10A.

After receipt of this message, at step 206, the eNB of terminal 10A, after verifying that the radio resources are sufficient, modifies the characteristics of the communication link between terminal 10A and terminal 10B so that it corresponds to the required Q2 level, particularly in terms of data rate.

On the alternate bidirectional link thus maintained between the user terminals 10A and 10B whose characteristics of data rate and/or latency and/or jitter have been adjusted to the PUSH-TO-VIDEO service, at step 207 (not illustrated), this PUSH-TO-VIDEO service can then be used by users A and B of these terminals, each able to send the other on this link and in turn, photos or videos in addition to voice data. These photos or videos are captured for example with an image sensor integrated in the user terminal or are extracted from the memory of the user terminal.

For example, as soon as the characteristics adjusted to the PUSH-TO-VIDEO service are established on the link between the user terminals A and B, the image sensor becomes active. In addition, an operating menu of the PUSH-TO-VIDEO service is displayed instead of the PTT service operating menu on the screen of the user terminal 10A. This menu comprises an « END field» for example to terminate the communication and allow freeing of the link, an « ADDITIONAL RECEIVER» field to communicate with an additional receiver via this PTT service and a « change to PTT» field.

Figure 5:
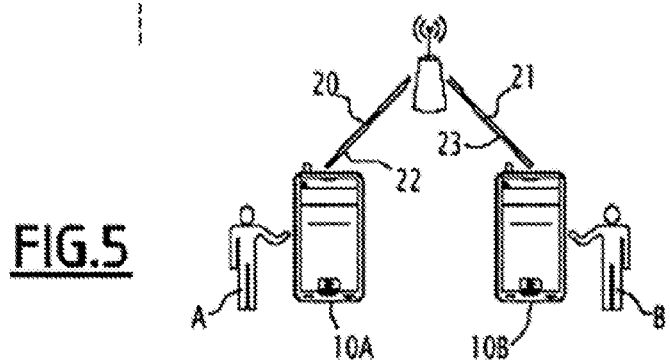
FIG. 5 illustrates a change of service in one embodiment of the invention.

In the configuration illustrated in FIG. 5, the terminals 10A and 10B depend on the same eNB.

During steps 107, 201 to 206, the communication link established to implement the PTT service between the terminals 10A and 10B comprises the radio resources 20 and 21 (for example each in the form of a dedicated portion of a radio channel, by time or frequency multiplexing). Then at step 207, the radio resources 22, 23 are added to the communication link between the terminals 10A and 10B so as to be able to implement the PUSH-TO-VIDEO service.

Once the users A, B have transmitted the photos/videos, either one can at a new step request the changeover to the PTT service without interrupting the communication, in the same manner as detailed above.

With the invention it is therefore possible to change over from one communication service to another without interrupting the communication in progress. In particular it becomes possible to add or cancel the capture and/or sending of photos/videos if a user terminal receives a call, and to adjust the necessary transmission resources in relation to these additions and cancellations.

The communication in progress is not interrupted: it is not necessary to interrupt the communication and then renew the call to set up the second service, with re-indication of the receiver. The users A and B remain in communication.

This maintaining of communication can be most appreciable in emergency situations, in particular for PMR wireless communication networks for example used by fire and police services.

This maintained communication can be most appreciable when the communication resources particularly radio resources are rare, and allows the readjustment of resources in relation to real-time needs of users.

It is not necessary to repeat signalling exchanges of « SIP Invite » type during which the communication service cannot be provided between A and B.

In the above-described embodiment, it is terminal A which requested providing of the PTT service, then changeover from the PTT service to the Push-to-Video service. In another embodiment it is user B of terminal 10B who requests the change of service.

In this case, the roles of user B and terminal 10B at the steps illustrated in FIG. 4 are reversed with those of user A and of terminal 10A.

In the embodiment described above, two user terminals are placed in communication. In other embodiments, more user terminals are placed in communication for the service. For example, a PTT communication service requested by user A may comprise 3 different receivers B, C and D. The invention is then applied to modify the characteristics of the links relating to all the receivers at the time of service change without interrupting the communication.

The invention can be applied for all successive communication services provided to at least two user terminals without breaking the communication between these two terminals, allowing the providing of this service with adaptation of latency or data rate on the communication link established between them.

The two services concerned are for example any different services from among types of calls defined in standard LTE 3GOO: alternate bidirectional communications of voice type, also called Hall-Duplex voice or Push-To-Talk (PTT), alternate bidirectional communications of « voice and video » type (comprising the real-time transmission of voice at the same time as video), also called Half Duplex « video and voice » or Push-To-Video, simultaneous bidirectional communications of voice type also called Full-Duplex « voice » simultaneous bidirectional communications of « voice and video » type (comprising the real-time transmission of voice at the same time as video) also called Full-Duplex video voice.

In one embodiment, this functionality of change of service with no break in communication is offered to the user during the providing of a said service, in each user terminal or only in some user terminals, in relation to data on the user terminal or on the user thereof.

In one embodiment of the invention, the communications between the user terminals, in particular the communication for example between user terminals 10A, 10B, are supervised by a supervisor terminal 10C.

The user C of a said supervisor terminal is the hierarchical superior for example of users A and B. By means of the supervisor terminal 10C, user C can listen to exchanges between users A and B on the link allocated to them. In one embodiment, the user C is able to request the changeover from a first service to a second service between users A and B on the communication link, without interrupting the communication.

Let us assume that the user terminals are considered to be in PTT communication conforming to step 107.

On the screen of the supervisor terminal 10C, for all supervisor communications and in particular for the PTT service, currently being provided between the terminals 10A and 10B, a menu displays fields offering changeovers to one or more services without interruption of the communication in progress.

At step 301, user C selects the field « change to PUSH-TO-VIDEO » on the screen of the supervisor terminal C, with regard to the communication in progress between terminals 10A, 10B.

At step 302, the supervisor terminal 10C detects this user request. It transmits a message via the network 1 to the server in charge of the PUSH-TO-VIDEO service, which here is also the APPS server, the message being of « SIP Update » type for example indicating this requested replacement of the PTT service between users A and B by a PUSH-TO-VIDEO service, giving the identification of the sender supervisor terminal 10C.

At step 303, the APPS server in relation to the content of databases verifies that user C is indeed authorised to request the replacement of the PTT service by the PUSH-TO-VIDEO service in a communication between the user terminals 10A, 10B and/or between users A and B.

The APPS server determines any particularities associated with the providing of the PUSH-TO-VIDEO service to this user A and/or terminal 10A, to user B and/or to user terminal 10B.

If the replacement by a PUSH-TO-VIDEO service when requested by user C of terminal 10C is indeed authorised, the APPS server sends a message to the PCRF module via the interface Rx requesting the providing of a PUSH-TO-VIDEO service to replace the PTT service without interruption of communication, identifying the terminals 10A, 10B and any particularities associated with the providing of the PUSH-TO-VIDEO service.

The steps 204 to 207 explained above are then performed.

If the providing of the PUSH-TO-VIDEO service is not authorised, a message is sent by the APPS server to terminal 10C indicating that the requested PUSH-TO-VIDEO service cannot be provided.

One the PUSH-TO-VIDEO service becomes available, a message from the APPS server is sent to terminals 10A, 10B causing the display on the screen of the terminals of a message informing the users that the PUSH-TO-VIDEO service is now available.

In addition, in the supervision menu of the communication between terminals 10A, 10B, a field « change to PTT » is displayed in particular.

This field, depending on the embodiments of the invention, may or may not be available in the operating menu of the PUSH-TO-VIDEO service then displayed on the screen of terminal 10A and/or 10B.

In one embodiment of the invention additional functions are implemented.

For example, one function is able to analyse the effective use of a link by the user terminals communicating on this link, to compare this effective use regularly with the characteristics of the requested service and, in relation to this comparison, to suggest on the screen of at least one of these user terminals to the user thereof a possible changeover to another service better adapted to the current communication profile without interrupting the communication (for example better in terms of type of content, in particular voice, video or data and/or profile of use).

For example, if a PUSH-TO-VIDEO service is set up, the detection may be made that only voice data have been transmitted over a time longer than a fixed threshold, and in this case a changeover to a PTT service may be suggested.

In one embodiment, this changeover is imposed upon a user, and in said case a message informing of the change in service is indicated on the screen.

Said functions can be implemented accordingly in a user terminal engaged in the communication, in a supervisor user terminal for a communication in which it does not take part and/or in an application server.

In the above-described embodiment, the invention is described with reference to radio terminals. Evidently, the invention can be also be implemented with terminals of any type (mobile telephones, landline telephones, pads, computers, servers e.g. an application server giving access to an interface comprising an IP camera and a micro, etc.) and connected to the network by links other than wireless links: in particular, wire, optical links etc., the links linking communicating terminals having characteristics which must be adapted to type of service.

What is claimed is:

1. A communication method in a communications network, in which a communication link has been allocated by a resource manager module in accordance with a set of characteristics required for the providing of a first service on the link and set up between at least one first communication terminal and a second communication terminal in the communications network, the set of required characteristics comprising a first value of at least one characteristic of at least one of data rate, latency and jitter on the link, the method comprising:

during the providing of the first service on the communication link:
transmitting a request to replace the first communication service by a second communication service between at least the first and second terminals;
after receipt of the request by the resource manager module of the network, replacing by the resource manager module of the first value of the characteristic of the established communication link, by a second value differing from the first value and required for the providing of the second service;
the method further including providing the second communication service instead of the first communication service between the first and second terminals on the communication link;
displaying, during the providing of the first service on the communication link, on a display screen of at least one supervisor terminal remote from the first terminal and from the second terminal, a sub-menu of the operating menu relating to the first service currently being provided, the sub-menu listing a group of at least one second service differing from the first service and comprising at least the second communication service; and
detecting, by the supervisor terminal, the selection made by a user of the supervisor terminal of the second service in the group of the at least one second service differing from the first service, the step of transmitting the request being performed by the supervisor terminal as a function of the step of detecting the selection.

2. The communication method as recited in claim 1 wherein the first and second communication services comprise different services from among alternate or simultaneous bidirectional communication services, of voice call or video call type.

3. The communication method as recited in claim 1 further comprising, during the providing of the first service on the communication link, detecting, by a terminal, from among the first terminal and the second terminal, the selection by a user of the terminal, of the second service from the group of the at least one second service differing from the first service, the step of transmitting the request being performed by the terminal as a function of the step of detecting the selection.

4. The communication method as recited in claim 3 further comprising:
displaying, during the providing of the first service on the communication link, on a display screen of at least one terminal from among the first terminal and the second terminal, a sub-menu of the operating menu of the first service currently being provided, the sub-menu listing the group of the at least one second service different from the first service currently being provided and comprising at least the second communication service; and
detecting, by the terminal of the selection made by a user of the terminal of the second service, from the group of the least one second service differing from the first service, the step of transmitting the request being performed by the terminal in relation to the step of detecting the selection.

5. The communication method as recited in claim 1 further comprising comparing, with a fixed threshold, the time of non-use of a functionality included in the first service and not included in the second service, the step of transmitting the request being a function of the comparing step.

6. The communication method as recited in claim 1 wherein the communication network comprises an LTE network and the resource manager module is a PCRF node.

7. A supervisor terminal comprising:
a display for displaying a supervision menu of a first service implemented between at least one communication terminal and another communication terminal, further to the establishing of a communication link between the at least one communication terminal and the other communication terminal in a communications network, allocated by a resource manager module as per a set of characteristics required for implementing a first service and comprising a first value of at least one characteristic of at least one of data rate, latency and jitter, and further to the implementation of the first service on the communication link, to; and
a transmitter for transmitting, during the implementation of the first service on the communication link, a request to replace the first communication service by a second communication service between at least the communication terminal and the other communication terminal,
the supervisor terminal being adapted, further to the replacement by the resource manager module of the first value of the characteristic of the established communication link by a second value differing from the first value and required for implementing the second service, to display a supervision menu of the second service implemented between the communication terminal and other communication terminal.

8. The supervisor terminal as recited in claim 7 wherein the supervisor terminal is adapted, during the providing of the first service on the communication link to detect the selection by a user of the supervisor terminal of the second service in the group of at least one second service different from the first service, the request transmission step being performed by the terminal in relation to the detection step.

9. The supervisor terminal as recited in claim 7 wherein the first and second communication services comprise different services from among alternate or simultaneous bidirectional communication services, of voice call or video call type.

10. The supervisor terminal as recited in claim 7 wherein the supervisor terminal is adapted, during the providing of the first service on the communication link, to display on a screen of the display of the supervisor terminal, a sub-menu of the operating menu of the first service currently being provided, the sub-menu listing a group of at least one second service differing from those of the first service currently being provided and comprising at least the second communication service; and adapted to detect the selection by a user of the supervisor terminal of the second service from the group of the at least one second service differing from the first service, the request transmission step being performed by the supervisor terminal in relation to the detection step.

11. The supervisor terminal as recited in claim 7 wherein the supervisor terminal is adapted to compare, with a fixed threshold, the time of non-use of a functionality included in the first service and not included in the second service, the transmission of the request being a function of the comparison step.

12. Non-transitory computer readable media having stored thereon a computer program comprising: computer executable instructions to control a supervisor terminal of a communications network, to establish a communication link between at least one communication terminal and another communication terminal in a communications network and allocated by a resource manager module as per a set of characteristics required for implementing a first service and comprising a first value of at least one characteristic of data rate and/or latency and/or jitter required for implementation of the first service on the communication link, where said establish step further includes:

displaying a supervision menu of the first service implemented between the terminal and other terminal;

during the implementing of the first service on the communication link, transmitting a request to replace the first communication service by a second communication service between at least the communication terminal and the other communication terminal; and further to replacement by the resource manager module of the first value of the characteristic of the established communication link by a second value differing from the first value and required for implementing the second service, displaying a supervision menu of the second service implemented between the communication terminal and other communication terminal.

\* \* \* \* \*